United States Patent [19]

Ito et al.

[11] Patent Number: 4,979,071
[45] Date of Patent: Dec. 18, 1990

[54] PROTECTION CIRCUIT FOR A SEMICONDUCTOR CIRCUIT

[75] Inventors: Takaaki Ito; Akio Uchida; Hiroyuki Ikeda, all of Yokoze, Japan

[73] Assignee: Mitsubishi Mining and Cement Co. Ltd., Tokyo, Japan

[21] Appl. No.: 243,705

[22] Filed: Sep. 13, 1988

[30] Foreign Application Priority Data

Sep. 16, 1987 [JP] Japan ................... 62-229650

[51] Int. Cl.$^5$ ................................................ H02H 3/24
[52] U.S. Cl. ...................................... 361/56; 361/104; 361/117; 361/119
[58] Field of Search .................. 361/56, 57, 86, 87, 361/91, 92, 111, 117, 118, 119, 120

[56] References Cited

U.S. PATENT DOCUMENTS

| 3,795,840 | 3/1974 | Cambra | 361/118 X |
| 4,389,695 | 6/1983 | Carpenter, Jr. | 361/56 X |
| 4,581,674 | 4/1986 | Brzozowski | 361/104 |
| 4,587,588 | 5/1986 | Goldstein | 361/104 X |

FOREIGN PATENT DOCUMENTS 186873 7/1986 European Pat. Off. ............ 361/119

*Primary Examiner*—Derek S. Jennings
*Attorney, Agent, or Firm*—Hoffman, Wasson & Gitler

[57] ABSTRACT

A protection circuit for a semiconductor circuit for protecting it from a thunder surge and overcurrent or overvoltage. A surge absorbing element and a Zenor diode are in parallel connected to the semiconductor circuit. A first fuse are connected before between the electric source and the surge absorbing element. A second fuse and a resistor, which is in series connection, is arranged between the surge absorbing element and the Zenor diode.

10 Claims, 2 Drawing Sheets

PROTECTION CIRCUIT FOR A SEMICONDUCTOR CIRCUIT

BACKGROUND OF THE INVENTION

1. Field of the Invention

The present invention relates to a circuit for protecting a semiconductor circuit from a thunder surge and overvoltage or overcurrent. The present invention relates, in particular, to such a circuit that can protect the semiconductor circuit from the surge and also can protect the semiconductor circuit from a continuous overcurrent like a leakage current from an alternating current source and the like. The present invention can preferably utilized for a telephone, key telephone system, PBX and the like.

2. Description of Related Art

Known in the prior art is a protection circuit from a thunder surge and overvoltage or overcurrent, which includes a fuse or metallic wire of low melting temperature as combined with an element for absorbing a surge such as arrestor or varistor. When a surge caused by, for example, a thunder is generated, a protection of the semiconductor circuit is attained by maintaining a level of voltage below a response voltage of the surge absorbing element, correspondig to a voltage for starting electric discharge in case where the element is formed by the arrestor, and to a varistor voltage in case where the element is formed by a varistor. For an overvoltage or overcurrent, a fuse is provided which is broken by an electric current generated in the fuse itself or by a generation of heat of the surge absorbing element, so that the circuit is made open, thereby protecting the circuit. For an overvoltage or overcurrent, both of the surge absorbing element and fuse can not be operated in the case where the value of the electric voltage is lower than the response voltage value and where the value of the electric current is lower than the breaking current value of the fuse, thereby maintaining the circuit to be closed. Thus, the protection of the circuit can not be realized.

In case of the recent semiconductor circuit, a Zener diode is connected in parallel to the circuit in order to attain a protection thereof. In this case, all of an overcurrent as generated is directed into the Zener diode, so that the surge absorbing element does not operate properly, thereby causing the Zener diode to be overheated under an electric current smaller than the melting temperature.

An object of the present invention is to provide a circuit for protecting a semiconductor circuit from a surge like a thunder and overvoltage or overcurrent.

Another object of the present invention is to provide a circuit for protecting a Zener diode from being subjected to overcurrent, which Zener diode is for protecting semiconductor circuit.

According to the present invention, an electrical circuit is provided, comprising:
- a semiconductor circuit;
- an electrical source for supplying the semiconductor circuit;
- surge absorbing means arranged parallel to the semiconductor circuit for absorbing a surge from the electrical source to the semiconductor circuit;
- a Zener diode arranged also parallel to the semiconductor circuit;
- a first fuse connected in series to the semiconductor circuit at a position between the electric source and the surge absorbing means, and;
- a second fuse and a resistor connected in series to the semiconductor circuit at a position between the surge absorbing means and the Zener diode.

Said second fuse has, preferably, a value of the breaking current which is smaller than that of the first fuse.

According to the present invention, the circuit can be made off by an overcurrent below the response voltage of the surge absorbing element, thereby protecting the circuit, while the protection of the semiconductor circuit from the surge like the thunder can be attained in the way as that attained in the prior art. According to the present invention the semiconductor circuit means a circuit including a semiconductor(s), which is easy to be damaged by a surge or leakage current, such as an integrated circuit(IC), a large scale integrated circuit(LSI), diode, transistor, or field effect transistor.

The first fuse is arranged adjacent to the surge absorbing element, for allowing the circuit to be broken when a continuous overcurrent is generated. The first fuse is not necessarily responsive to an electric current, and may therefore be those responsive to a heat generated by the surge absorbing element. A wire made from a metal of low melting temperature may be used as the first fuse. The surge absorbing element may be a surge absorbing element of a micro gap type, arrestor or varistor.

When a continuous electric current smaller than the breaking current of the first fuse near the surge absorbing element is applied under a voltage lower than the response voltage of the surge absorbing element, the Zener diode is made on, and simultaneously the second fuse is broken, so that the semiconductor circuit is prevented from being applied overvoltage and overcurrent. When a surge like a thunder is generated, an electric current is generated in the Zenor diode faster than in the surge absorbing element. This electric current is, however, instantaneous. A voltage drop is generated between a resistor arranged in series to the Zener diode and the semiconductor circuit, which voltage drop is equal to value of the resistor multiplied by surge electric current. The surge absorbing element can a voltage generated by this voltage drop. The volume of the second fuse is sufficient if it allows the electric current generated instantaneously at the generation of the surge. This means that the breaking current of second fuse near to the Zenor diode can be very much smaller than that of the first fuse near the surge absorbing element. Preferably, the second fuse near to the Zener diode has a value of breaking current smaller than one second of the value of the breaking current of the first fuse near the surge absorbing element.

The Zener diode should have a value of breakdown voltage for effectively protecting the semiconductor circuit, which is generally higher than the value of maximum electric voltage applied to the semiconductor circuit.

The value of the breaking current of the second fuse in series to the Zener diode is selected so as to be larger than the maximum electric current applied to the semiconductor circuit, and is preferably in a range between 100 to 200 mA.

With regard to the resistor arranged in series to the second fuse at position between the surge absorbing element and the semiconductor circuit, as the value of the resistor becomes larger, the value of electric current for obtainig the desired voltage is decreased further. This means that, as the value of the resistor is increased more, the value of electric current passing in the second fuse and the Zener diode until the operation of the surge absorbing element can be conveniently decreased further. However, considering the effect to the semiconductor circuit, the value of the resistor is preferably in a range between 5 to 20 W.

DETAILED DESCRIPTION OF A PREFERRED EMBODIMENT

Figure 1:
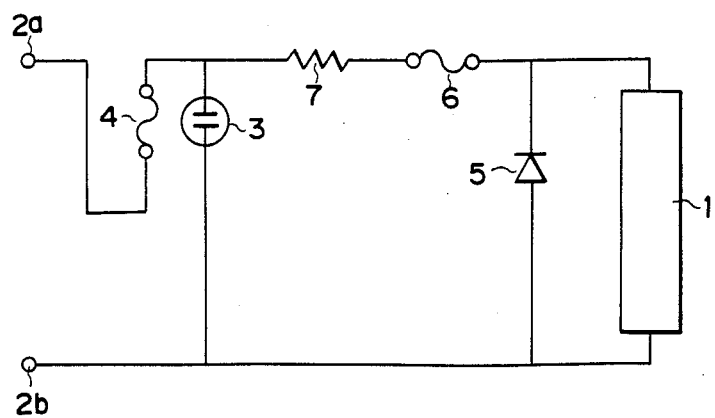
FIG. 1 shows a protection circuit according to the present invention.
Figure 3:
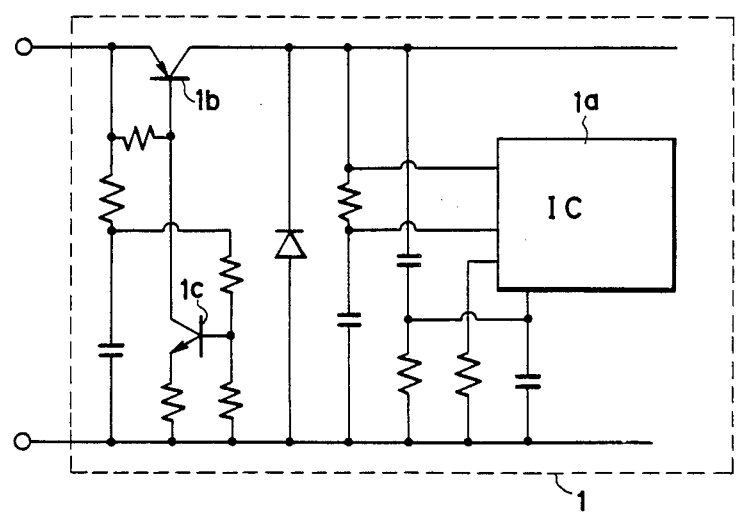
FIG. 3 shows a semiconductor circuit as a control circuit for a telephone.

A semiconductor circuit, which may be a control circuit for a telephone as shown in FIG. 3, is connected to terminals 2a and 2b to which an electric power source (not shown in FIG. 1) is connected. When the semiconductor circuit is a control circuit housed in a telephone, the terminals 2a and 2b are, of course, connected to a telephone line. Connected in parallel to the semiconductor circuit 1 is a surge absorbing element 3. A first fuse 4 is connected in series to the semiconductor circuit 1 between the surge absorbing element 3 and the terminal 2a. A Zener diode 5 is connected in parallel to the semiconductor circuit 1. A second fuse 6 and a resistor 7, which are connected in series, are arranged between the surge absorbing element 3 and the semiconductor circuit 1. In this embodiment, the Zener diode 5, having a breakdown voltage (threshold value) of 22 volt, is employed. As a surge absorbing element 3, an arrestor of micro-gap type is employed, which has a value of voltage of 400 volt for starting a discharge. The first fuse 4 arranged adjacent to the surge absorbing element 3 has a value of breaking current of 0.5 A, while the second fuse 6 arranged adjacent to the Zener diode has a value of breaking current of 0.1 A. The resistor 5 has a value of resistance of 20 W and a value of limit power of 1 Watt.

The semiconductor circuit as a control circuit for a telephone is shown in FIG. 3. The control circuit is provided, typically, with an integrated circuit 1a for controlling various operation of a telephone set, such as operation of a bell, control of dial pulse or loud speaker.

Figure 2:
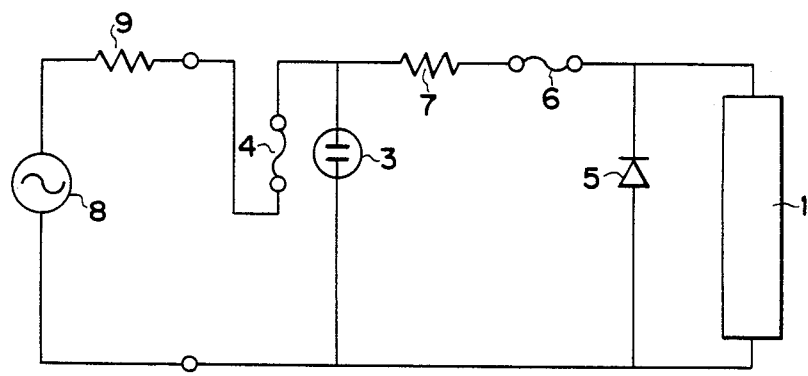
FIG. 2 shows a test circuit for testing the protection circuit in FIG. 1.

A load is connected to the protection circuit according to the present invention in order to test the effect thereof. As shown in FIG. 2, a testing circuit for attaining a load test is constructed. An alternate current source 8 is connected to the terminals 2a and 2b, via a resistor 9. A value of the voltage of the power supply 8 and value of the resistor 9 are changed in order to attain the load test. The result of the test is shown in the following table.

TABLE 1

| Voltage of Power Supply | Value of Resistor 9 | Result of Test |
| --- | --- | --- |
| 200 Volt | 200 ohm | Fuse 6 is broken. |
| 200 Volt | 85 ohm | Fuse 6 is broken. |
| 100 Volt | 200 ohm | Fuse 6 is broken. |

TABLE 1-continued

| Voltage of Power Supply | Value of Resistor 9 | Result of |
| --- | --- | --- |
| 100 Volt | 85 ohm | Fuse 6 is broken. |

Comparative Test

A protection circuit having the same construction except that the no second fuse 6 is provided is subjected to the same load test. The result is shown in Table 2.

TABLE 2

| VOltage of Power Supply | Value of Resistor 9 | Result of Test |
| --- | --- | --- |
| 200 Volt | 200 ohm | Diode 5 is heated. |
| 200 Volt | 85 ohm | Diode 5 is heated |
| 100 Volt | 200 ohm | Diode 5 is heated. |
| 100 Volt | 85 ohm | Diode 5 is heated. |

As will be easily understood from the tests, the present invention may allow the second fuse 6 to be broken for preventing the Zener diode 5 from being thermally damaged. FIG. 3 shows a typical semiconductor circuit 1 (see FIGS. 1 and 2) which is to be protected by the protection circuit. This semiconductor circuit could be a transistor and integrated circuit which can be utilized in a telephone set, a facsimile apparatus, a PBX, a modem and the like. For example, as specifically shown in FIG. 3, a control circuit for telephone lines is to be afforded the protection of the circuitry shown in FIGS. 1 and 2 in which 1a represents a dialing integrated circuit, 1b is a switching transistor (for example, 2SA1156) and 1c is an amplifying transistor for higher frequency current (e.g. 2SC2551).

The protection circuit according to the present invention allows a semiconductor circuit to be protected not only from a thunder surge but also from overvoltage or overcurrent of a level of very smaller than the voltage in the surge like the thunder although damaging the semiconductor circuit, and also allows the Zener diode to be protected from being heated.

Secondly, a very simplified construction of the protection circuit is realized from the Zener diode, fuse and surge absorbing element.

Furthermore, a safe utilization of a semiconductor circuit such as an integrated circuit is realized.

We claim:

1. A protection circuit for a semiconductor circuit, comprising
    an electrical source connected to the semiconductor circuit for supplying current to the semiconductor circuit;
    a gas discharge tube surge absorbing device arranged in parallel with the semiconductor circuit for absorbing a surge from said electrical source to the semiconductor circuit;
    a Zener diode arranged in parallel between said surge absorbing device and the semiconductor circuit;
    a first fuse connected in series with the semiconductor circuit at a position between said electrical source and said surge absorbing means; and
    a second fuse and resistor connected in series with the semiconductor circuit at a position between said surge absorbing means and said Zener diode, said first and second fuses breaking down at differing applied amperages.

2. The protection circuit in accordance with claim 1, wherein said first fuse breaks down at an amperage value greater than said second fuse.

3. The protection circuit in accordance with claim 1, wherein said surge absorbing means is a micro-gap arrestor.

4. The protection circuit in accordance with claim 2, wherein said surge absorbing means is a micro-gap arrestor.

5. A protection circuit for a semiconductor circuit, comprising:
   an electrical source connected to the semiconductor circuit for supplying current to the semiconductor;
   a gas discharge tube surge absorbing device arranged in parallel with the semiconductor circuit for absorbing a surge from said electrical source to the semiconductor circuit;
   a Zener diode arranged in parallel between said surge absorbing device and the semiconductor circuit;
   a first fuse connected in series with the semiconductor circuit at a position between said electrical source and said surge absorbing means, said first fuse positioned adjacent to said surge absorbing device to activate said first fuse responsive to the heat generated by a continuous overcurrent flowing through said surge absorbing device when excessively loaded, thereby producing an open circuit; and
   a second fuse and resistor connected in series with the semiconductor circuit at a position between said surge absorbing means and said Zener diode, said first and second fuses breaking down at differing applied amperages.

6. The protection circuit in accordance with claim 5, wherein said first fuse is of a wire made from low melting temperature.

7. The protection circuit in accordance with claim 5, wherein said first fuse breaks down at an amperage value greater than said second fuse.

8. The protection circuit in accordance with claim 6, wherein said first fuse breaks down at an amperage value greater than said second fuse.

9. The protection circuit in accordance with claim 5, wherein said surge absorbing means is a micro-gap arrestor.

10. The protection circuit in accordance with claim 6, wherein said surge absorbing means is a micro-gap arrestor.

* * * * *